United States Patent
Vanstone

[11] 3,903,089
[45] Sept. 2, 1975

[54] URSOLIC ACID DERIVATIVES
[75] Inventor: Anthony Edward Vanstone, Twickenham, England
[73] Assignee: Biorex Laboratories, Limited, England
[22] Filed: Mar. 5, 1974
[21] Appl. No.: 448,385

[30] Foreign Application Priority Data
Mar. 15, 1973 United Kingdom............... 12427/73

[52] U.S. Cl.... 260/268 PC; 260/250 R; 260/251 R; 260/293.56; 260/295 A; 260/309; 260/310 R; 260/310 D; 260/326.4; 260/326.5 CA; 260/332.2 C; 260/346.2 R; 260/404; 260/410; 260/468 G; 260/476 C; 260/485 L; 260/486 R; 260/488 CD; 424/250
[51] Int. Cl.²...................................... C07D 295/18
[58] Field of Search........ 260/268 PC, 468.5, 485 L

[56] References Cited
OTHER PUBLICATIONS
Robert A. Micheli, J. Org. Chem., 27, pp. 666–667 (1962).
Kal'yan et al., Chemical Abstracts, Vol. 67, p. 32840y (1967).

Primary Examiner—Donald G. Daus
Assistant Examiner—Jose Tovar
Attorney, Agent, or Firm—Wenderoth, Lind & Ponack

[57] ABSTRACT
The present invention provides new ursolic acid derivatives of the general formula:

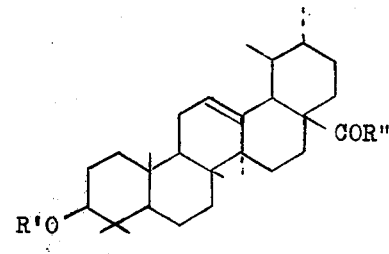

wherein R' is a hydrogen atom or an acyl radical derived from a mono- or polycarboxylic acid and R" is a hydroxyl group or a radical of the general formula —$OR_1$, wherein $R_1$ is a straight-chain or branched, saturated or unsaturated aliphatic radical or a radical of the general formula

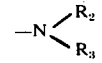

wherein $R_2$ and $R_3$, which may be the same or different, are hydrogen atoms or straight-chain, branched or cyclic aliphatic radicals or aromatic radicals or wherein $R_2$ and $R_3$, together with the nitrogen atom to which they are attached, form a heterocyclic radical, which may contain further hetero atoms, with the proviso that, at the same time, R' is not a hydrogen atom and R" is not a hydroxyl group, and the non-toxic salts of compounds which contain at least one free carboxylic acid group and/or at least one basic nitrogen atom.

6 Claims, No Drawings

URSOLIC ACID DERIVATIVES

BACKGROUND OF THE INVENTION

Numerous compounds are already known for the treatment of inflammatory conditions and it is an object of the present invention to provide a new group of valuable and effective anti-inflammatory compounds.

SUMMARY OF THE INVENTION

The present invention provides new ursolic acid derivatives of the general formula:

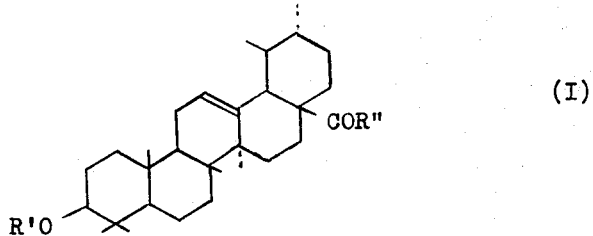

wherein R' is a hydrogen atom or an acyl radical derived from a mono- or polycarboxylic acid which can be aliphatic, heterocyclic or aromatic, for example, acetic acid, propionic acid, butyric acid, capylic acid, lauric acid, palmitic acid, stearic acid, acrylic acid, geranic acid, linoleic acid, malonic acid, succinic acid, glutaric acid, sebacic acid, a cyclohexane-dicarboxylic acid, benzoic acid, salicylic acid or benzilic acid, and R'' is a hydroxyl group or a radical of the general formula $-OR_1$, wherein $R_1$ is a straight-chain or branched, saturated or unsaturated aliphatic radical, which preferably contains up to 6 carbon atoms, for example, a methyl, ethyl, n-propyl, isopropyl, n-pentyl or n-hexyl radical, or a radical of the general formula

wherein $R_2$ and $R_3$, which may be the same or different, are hydrogen atoms or straight-chain, branched or cyclic aliphatic radicals, preferably containing up to 8 carbon atoms, or aromatic radicals, for example, methyl, ethyl, n-propyl, isopropyl, n-hexyl, cyclohexyl, phenyl or naphthyl radicals, or wherein $R_2$ and $R_3$, together with the nitrogen atom to which they are attached, form a heterocyclic radical, which may contain further hetero atoms, such as nitrogen, substituted nitrogen, sulphur and oxygen atoms, for example, a thienyl, furyl, pyrrolyl, imidazolyl, pyrazolyl, pyridyl, pyrazinyl, pyrimidyl, pyrrolidinyl, pyrrolinyl, pyrazolidinyl, piperidyl, N-alkyl-piperidyl, piperazinyl or N-alkyl-piperazinyl radical, with the proviso that, at the same time, R' is not a hydrogen atom and R'' is not a hydroxyl group; and the non-toxic salts of compounds of general formula (I) which contain at least one free carboxylic acid group and/or which contain at least one basic nitrogen atom.

DETAILED DESCRIPTION OF THE INVENTION

For the preparation of compounds of general formula (I) in which R' is an acyl radical and R'' is a hydroxyl group, ursolic acid 'R' = H; R'' = OH) can be reacted with a reactive derivative of a mono- polycarboxylic acid, for example an anhydride or acid halide.

For the preparation of compounds of general formula (I) in which R' has the same meaning as above and R'' is other than a hydroxyl group, ursolic acid or a 3-O-acyl derivative thereof is either esterified to give compounds in which R'' is an $-OR_1$ radical or is converted into an acid halide and this acid halide then reacted with an amine of the general formula $R_2-NH-R_3$, wherein $R_2$ and $R_3$ have the same meanings as above, whereafter, if desired, the 3-O-acyl radical can be removed by hydrolysis to liberate the 3-hydroxyl group.

When the product obtained contains at least one free carboxylic acid group, this can be reacted with a non-toxic inorganic or organic base, for example, a basic alkali metal or alkaline earth metal hydroxide or carbonate or a basic zinc, aluminium or magnesium compound or a nontoxic amine to give a corresponding salt and when the product obtained contains at least one basic nitrogen atom, it can be reacted with a non-toxic inorganic or organic acid, for example, hydrochloric, sulphuric, phosphoric, acetic, malic, succinic, tartaric or citric acid, to give a corresponding acid-addition salt.

The following Examples are given for the purpose of illustrating the present invention:

EXAMPLE 1

5 ml. dry pyridine, 1.7 g. succinic anhydride and 5 g. ursolic acid were heated under reflux for 3 hours, whereafter a thin layer chromatogram shows the complete absence of starting material. The reaction mixture was then cooled, poured into ice-water containing an excess of hydrochloric acid, stirred for 15 minutes and the solid product filtered off, washed thoroughly with water and dried. The 6 g. of crude product thus obtained were dissolved in acetone, treated with charcoal and filtered. The filtrate yielded 4.3 g. of pure 3β-O-succinyl-ursan-12-en-28-oic acid.

This compound was then finely ground and suspended in 70 ml. methanol, whereafter 29.3 ml. of 0.5N aqueous sodium hydroxide solution were added, while stirring, over the course of 10 minutes. The resulting cloudy solution was stirred for a further 10 minutes, filtered and the methanol evaporated off at 40°C. under reduced pressure. A small amount of water was added to redissolve the precipitated product and the solution was filtered and poured into 600 ml. acetone. The precipitate was filtered off, washed with acetone and dried in a vacuum oven at 100°C. There were obtained 3.5 g. of the disodium salt of 3β-O-succinoyl-ursan-12-en-28-oic acid; m.p. >330°C.; $[\alpha]_D^{20} = +45.3° \pm 1°$ (c. = 1% in methanol/0.2% aqueous sodium carbonate solution (1:1)).

EXAMPLE 2

4 g. 3-O-acetyl-ursolic acid were dissolved in 20 ml. thionyl chloride and the solution left to stand at ambient temperature for 15 hours. Excess thionyl chloride was then distilled off at 40°C. under reduced pressure. The solid obtained was crystallised from petroleum ether (b.p. 60° – 80°C.), filtered off, washed with cold petroleum ether (b.p. 60° – 80°C.) and dried in a vacuum oven at 80°C. There were obtained 3 g. of the off-white crystalline acid chloride.

This acid chloride was dissolved in 20 ml. anhydrous benzene and 2.0 g. N-methyl-piperazine added thereto. The reaction mixture was left to stand at ambient temperature for 16 hours, after which time thin layer chromatography (chloroform-methanol 9:1) showed the reaction to be complete. The reaction mixture was filtered to remove precipitated N-methyl-piperazine hydrochloride and the filtrate was washed with water and evaporated to dryness. The solid residue obtained was dissolved in 50 ml. diethyl ether and excess ethereal hydrochloric acid added thereto. The reaction mixture was evaporated to dryness and the solid obtained was crystallised from ethyl acetate to give 2.5 g. 3$\beta$-O-acetoxy-ursan-12-en-28-oic acid N-methylpiperazinamide hydrochloride which was uniform on a thin layer chromatogram (chloroform-methanol 9:1); m.p. 276° – 281°C. (with decomp. at about 267°C.); $[\alpha]_D^{23} = + 25.5° \pm 1°$ (c. = 1% in chloroform-methanol 1:1).

0.5 g. of this hydrochloride was dissolved in a small amount of methanol and excess ammonia added thereto. The solution was then diluted with diethyl ether, washed with water, dried over anhydrous sodium sulphate, filtered and the filtrate evaporated to dryness to give 0.4 g. of product which was uniform on a thin layer chromatogram (chloroform-methanol 9:1). This product, i.e., 3$\beta$-O-acetoxy-ursan-12-en-28-oic acid N-methyl-piperazinamide, had a melting point of 161° – 163°C.; $[\alpha]_D^{23.5} = + 30.6° \pm 1°$ (c. = 1% in chloroform).

EXAMPLE 3

6 g. N-carbethoxy piperazine were added to a solution of 13 g. 3-O-acetyl-ursolic acid chloride in 60 ml. pyridine and the reaction mixture was refluxed for 4 hours, whereafter it was poured into a mixture of ice water and excess hydrochloric acid. This was extracted with chloroform and the chloroform extract was washed with dilute hydrochloric acid and then with water and dried over anhydrous magnesium sulphate. After removing the solvent, there were obtained 14 g. of 3$\beta$-O-acetyl-ursolic acid N-carbethoxypiperazinamide which could not be crystallised.

This amide was refluxed for 5 hours in a 15% solution of potassium hydroxide in ethanol. The precipitated solid was filtered off and then thoroughly washed with ethanol and dichloromethane. After evaporation, there were obtained 12 g. of a white foam which was crystallised from methanol. This product was dissolved in methanol and mixed with an ethereal solution of hydrogen chloride. The crystalline precipitate formed was filtered off, thoroughly washed with ether and then dried. After recrystallisation from ether/methanol, there were obtained 9.8 g. of ursolic acid piperazinamide hydrochloride, which had a melting point of 355°C.; $[\alpha]_D^{21.3} = + 37°$ (c. = 1% in chloroform/methanol).

The free base can be obtained therefrom by neutralisation with ammonia (cf. Example 2).

EXAMPLE 4

11.0 g. ursolic acid and 7.0 g. cis-hexahydrophthalic anhydride were dissolved in 16 ml. anhydrous pyridine and the resultant solution heated under reflux for 5 hours, whereafter a thin layer chromatogram showed the complete absence of starting material. The reaction mixture was poured into 172 ml. acetone, a mixture of 2 ml. concentrated hydrochloric acid and 36 ml. distilled water was added thereto, followed by stirring for 30 minutes and filtration. 10 ml. distilled water were added to the filtrate, followed by stirring for 30 minutes and filtration. The two crops of product thus obtained by filtration were combined, washed with acetone and water (70:30) and then washed with water until the washings were neutral, followed by drying in a vacuum oven. There were thus obtained 13.6 g. 3$\beta$-O-cis-hexahydrophthaloylursan-12-en-28-oic acid.

12.22 g. of this hemiester were finely ground and suspended in 100 ml. methanol. While stirring, 76 ml. 0.5N aqueous sodium hydroxide solution were added to this suspension over the course of 10 minutes. A further 50 ml. methanol were then added to the solution, the cloudy solution obtained was heated to 40°C. and stirred for 30 minutes, then allowed to cool and filtered. Most of the methanol was then evaporated off under reduced pressure at 40°C., the product thereby being precipitated. 10 ml. water and 150 ml. acetone were then added thereto. Upon stirring, a clear solution was obtained which was poured into 2 litres acetone. The precipitated white solid was filtered off, washed with acetone and dried for several hours in a vacuum oven at 110°C. There were obtained 9.8 g. of the disodium salt of 3-O-cis-hexahydrophthaloyl-ursan-12-en-28-oic acid; m.p. >310°C.; $[\alpha]_D^{20} = + 41.2°$ (c. = 1% in methanol/0.2% aqueous sodium carbonate solution (1:1)).

EXAMPLE 5

20 ml. anhydrous pyridine, 2.5 g. glutaric anhydride and 5 g. ursolic acid were heated under reflux for 6 hours, whereafter a thin layer chromatogram showed the reaction to be complete. The reaction mixture was cooled, poured into ice water containing excess hydrochloric acid, stirred for 15 minutes and the solid material filtered off, washed thoroughly with water and dried. The yield was 5.9 g. impure 3$\beta$-O-($\gamma$-carboxybutyryl)-ursan-12-en-28-oic acid.

2.5 g. of this hemiester were finely ground, suspended in 50 ml. methanol and 15.6 ml. 0.5N aqueous sodium hydroxide solution added thereto, while stirring, over the course of 10 minutes. The resulting cloudy solution was stirred for a further 15 minutes, filtered and the methanol evaporated off from the filtrate under a vacuum at 40°C. A small amount of acetone was added to redissolve the product and the clear solution obtained was poured into 500 ml. acetone. The white precipitate formed was filtered off, washed with acetone and dried in a vacuum oven at 100°C. The product obtained was dissolved in a minimum amount of water-acetone (2:1), the cloudy solution obtained was filtered and 500 ml. acetone were added to the filtrate. The precipitate obtained was filtered off, washed with acetone and dried in a vacuum oven at 110°C. to give 1.8 g. of the disodium salt of 3$\beta$-O-($\gamma$-carboxybutyryl)-ursan-12-en-28-oic acid, which was uniform on a thin layer chromatogram; m.p. >360°C. (decomp. at 320° – 325°C.); $[\alpha]_D^{23} = + 44.5° \pm 1°$ (c. = 1% in methanol - 2% aqueous sodium carbonate solution 1:1).

0.5 g. of this disodium salt was dissolved in water, acidified with dilute hydrochloric acid and the precipitated free acid was extracted with chloroform. This extract was washed with water, dried over anhydrous sodium sulphate, filtered and the filtrate evaporated to dryness to give 0.35 g. 3β-O-(γ-carboxybutyryl)-ursan-12-en-28-oic acid; m.p. 231° – 233°C. (decomp.); $[\alpha]_D^{24} = +54.9° \pm 1°$ (c. = 1% in chloroform - methanol 1:1). The product was uniform on a thin layer chromatogram (chloroform-methanol 9:1).

The present invention also includes within its scope pharmaceutical compositions containing the new ursolic acid derivatives. These pharmaceutical compositions can be administered orally or parenterally in admixture with a solid or liquid pharmaceutical carrier.

Solid compositions for oral administration include compressed tablets, pills, dispersible powders and granules. In such solid compositions, one of the new derivatives is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of absorbable material, such as gelatine, containing one of the new derivatives, with or without the addition of diluents or excipients.

Preparations according to the present invention for parenteral administration include sterile aqueous or nonaqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active material in the compositions of the present invention may be varied, it being necessary that it should constitute a proportion such that a suitable dosage for the desired therapeutic effect shall be obtained. In general, the preparations of the present invention should be administered orally or parenterally to humans to give 10 to 1000 mg., preferably 50 – 500 mg. of active substance per day.

The following Example illustrates pharmaceutical compositions according to the present invention:

EXAMPLE 6

250 mg. tablets are prepared containing:

| | |
|---|---|
| 3β-O-succinoyl-ursan-12-en-28-oic acid | 50 mg. |
| starch | 100 mg. |
| lactose | 95 mg. |
| magnesium stearate | 5 mg. |

The composition according to Example 6 is intended for oral administration to humans for the treatment of anti-inflammatory conditions.

I claim:

1. An ursolic acid derivative of the formula:

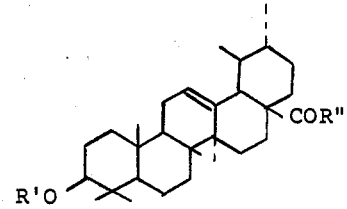

wherein R' is hydrogen or acetyl and R'' is piperazino, N-methyl-piperazino or N-carbethoxy-piperazino; or the non-toxic acid addition salts thereof.

2. A compound according to claim 1, which is 3β-O-acetoxy-ursan-12-en-28-oic acid N-methyl-piperazinamide hydrochloride.

3. A compound according to claim 1, which is 3β-O-acetoxy-ursan-12-en-28-oic acid N-methyl-piperazinamide.

4. A compound according to claim 1, which is 3β-O-acetyl-ursolic acid N-carbethoxypiperazinamide.

5. A compound according to claim 1, which is ursolic acid piperazinamide.

6. A compound according to claim 1, which is ursolic acid piperazinamide hydrochloride.

* * * * *